United States Patent
Kambayashi et al.

(10) Patent No.: US 6,804,113 B2
(45) Date of Patent: Oct. 12, 2004

(54) PORTABLE-TYPE INFORMATION APPARATUS

(75) Inventors: Ko Kambayashi, Kawasaki (JP); Shigeru Hidesawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/397,285

(22) Filed: Mar. 27, 2003

(65) Prior Publication Data

US 2003/0184962 A1 Oct. 2, 2003

Related U.S. Application Data

(63) Continuation of application No. 09/879,115, filed on Jun. 13, 2001, now Pat. No. 6,724,615, which is a continuation of application No. 08/885,857, filed on Jun. 30, 1997, now Pat. No. 6,411,503.

(30) Foreign Application Priority Data

Oct. 11, 1996 (JP) .............................................. 8-270205

(51) Int. Cl.[7] ................................................ G06F 1/16
(52) U.S. Cl. ....................... 361/686; 710/303; 439/638; 340/711
(58) Field of Search ................................. 361/686, 683, 361/656, 659; 320/137; 307/150; 439/638, 133, 650–654; 340/711, 700, 784; 429/96, 97, 99, 100, 123; D14/314, 107, 128; 710/303, 304

(56) References Cited

U.S. PATENT DOCUMENTS

| | | |
|---|---|---|
| 4,680,674 A | 7/1987 | Moore |
| 4,858,162 A | 8/1989 | Kieffer et al. |
| 4,893,263 A | 1/1990 | Myers |
| 4,926,365 A | 5/1990 | Hsieh |
| 4,958,889 A | 9/1990 | Boyle et al. |
| 4,978,949 A | 12/1990 | Herron et al. |
| 4,991,058 A | 2/1991 | Watkins et al. |
| 5,030,128 A | 7/1991 | Herron et al. |
| 5,098,312 A | 3/1992 | Raczynski |
| 5,120,243 A | 6/1992 | Mee |

(List continued on next page.)

FOREIGN PATENT DOCUMENTS

| | | |
|---|---|---|
| EP | 0 618 525 | 10/1994 |
| EP | 0 838 750 | 4/1998 |
| JP | 3-171312 | 7/1981 |
| JP | 58-033735 | 2/1983 |
| JP | 63-8960 | 1/1988 |

(List continued on next page.)

OTHER PUBLICATIONS

"Windows 95—Libretto 20," *Mobile PC*, vol. 2, No. 6, Jun. 1, 1996, pp. 25–29 (with English language translations of relevant parts of article).

(List continued on next page.)

Primary Examiner—Lisa Lea-Edmonds
(74) Attorney, Agent, or Firm—Staas & Halsey LLP

(57) ABSTRACT

A notebook type personal computer has a common connector detachably connected to a mating connector of a connection unit, or replicator, which further has plural connectors affording detachable connections to plural peripheral units. One or more fastener units, carried by the connector unit, provide for detachably but rigidly affixing the connector unit to the notebook type personal computer. An alternative connector box accommodates one or more batteries while affording connections through the common connector and the plural first connectors to peripheral units and yet another alternative connector box houses only batteries and is connectable through a mating connector to the common connector of the personal computer to afford extended operating time.

19 Claims, 4 Drawing Sheets

U.S. PATENT DOCUMENTS

| | | |
|---|---|---|
| 5,126,954 A | 6/1992 | Morita |
| 5,153,817 A | 10/1992 | Hosoi et al. |
| 5,182,699 A | 1/1993 | Kobayashi et al. |
| 5,186,646 A | 2/1993 | Pederson |
| 5,187,645 A | 2/1993 | Spalding et al. |
| 5,196,993 A | 3/1993 | Herron et al. |
| 5,217,394 A | 6/1993 | Ho |
| 5,265,238 A | 11/1993 | Canova, Jr. et al. |
| 5,278,730 A | 1/1994 | Kikinis |
| 5,290,178 A | 3/1994 | Ma |
| 5,301,334 A | 4/1994 | Horiuchi |
| 5,311,397 A | 5/1994 | Harshberger et al. |
| 5,331,509 A | 7/1994 | Kikinis |
| 5,365,230 A | 11/1994 | Kikinis |
| 5,400,055 A | 3/1995 | Ma et al. |
| 5,410,712 A | 4/1995 | Okuno |
| 5,411,416 A | 5/1995 | Balon et al. |
| 5,412,538 A | 5/1995 | Kikinis et al. |
| 5,428,798 A | 6/1995 | Sekine et al. |
| 5,430,609 A | 7/1995 | Kikinis |
| 5,430,883 A | 7/1995 | Horiuchi |
| 5,436,792 A | 7/1995 | Leman et al. |
| 5,440,748 A | 8/1995 | Sekine et al. |
| 5,457,785 A | 10/1995 | Kikinis et al. |
| 5,459,637 A | 10/1995 | Ma et al. |
| 5,460,547 A | 10/1995 | Belt et al. |
| 5,473,506 A | 12/1995 | Kikinis |
| 5,475,271 A | 12/1995 | Shibasaki et al. |
| 5,478,253 A | 12/1995 | Biechler et al. |
| 5,502,838 A | 3/1996 | Kikinis |
| 5,506,749 A | 4/1996 | Matsuda |
| 5,522,089 A | 5/1996 | Kikinis et al. |
| 5,537,343 A | 7/1996 | Kikinis et al. |
| 5,539,616 A | 7/1996 | Kikinis |
| 5,557,562 A | 9/1996 | Yoshiharu et al. |
| 5,561,772 A | 10/1996 | Dornier et al. |
| 5,567,180 A | 10/1996 | Seo |
| 5,579,489 A | 11/1996 | Dornier et al. |
| 5,580,182 A | 12/1996 | Lin |
| 5,583,744 A | 12/1996 | Oguchi et al. |
| 5,590,382 A | 12/1996 | Kikinis et al. |
| 5,600,800 A | 2/1997 | Kikinis et al. |
| 5,615,393 A | 3/1997 | Kikinis et al. |
| 5,619,659 A | 4/1997 | Kikinis et al. |
| 5,628,031 A | 5/1997 | Kikinis et al. |
| 5,633,920 A | 5/1997 | Kikinis et al. |
| 5,634,080 A | 5/1997 | Kikinis et al. |
| 5,640,302 A | 6/1997 | Kikinis |
| 5,677,827 A | 10/1997 | Yoshioka et al. |
| 5,680,126 A | 10/1997 | Kikinis |
| 5,680,625 A | 10/1997 | Sekine et al. |
| 5,689,654 A | 11/1997 | Kikinis et al. |
| 5,692,199 A | 11/1997 | Kikinis et al. |
| 5,708,840 A | 1/1998 | Kikinis et al. |
| 5,721,668 A | 2/1998 | Barrus et al. |
| 5,721,837 A | 2/1998 | Kikinis et al. |
| 5,729,478 A | 3/1998 | Ma et al. |
| 5,752,075 A | 5/1998 | Kikinis |
| 5,764,477 A | 6/1998 | Ohgami et al. |
| 5,790,100 A | 8/1998 | Kikinis |
| 5,790,644 A | 8/1998 | Kikinis |
| 5,793,957 A | 8/1998 | Kikinis et al. |
| 5,799,067 A | 8/1998 | Kikinis et al. |
| 5,799,068 A | 8/1998 | Kikinis et al. |
| 5,805,901 A | 9/1998 | Dornier et al. |
| 5,805,902 A | 9/1998 | Kikinis et al. |
| 5,812,870 A | 9/1998 | Kikinis et al. |
| 5,835,732 A | 11/1998 | Kikinis et al. |
| 5,861,873 A | 1/1999 | Kikinis |
| 5,867,406 A | 2/1999 | Yanagisawa |
| 5,920,206 A | 7/1999 | Kikinis |
| 5,921,801 A | 7/1999 | O'Sullivan et al. |
| 5,930,517 A | 7/1999 | Diehl et al. |
| 6,059,599 A | 5/2000 | Huang |
| 6,137,591 A | 10/2000 | Kikinis |
| 6,273,742 B1 | 8/2001 | Castagna et al. |
| 6,364,688 B1 | 4/2002 | Fraley, II et al. |
| 6,407,914 B1 | 6/2002 | Helot |

FOREIGN PATENT DOCUMENTS

| | | |
|---|---|---|
| JP | 63-55655 | 3/1988 |
| JP | 2-73224 | 6/1990 |
| JP | 2-287719 | 11/1990 |
| JP | 3-223915 | 10/1991 |
| JP | 3-244013 | 10/1991 |
| JP | 3-269608 | 12/1991 |
| JP | 3-294917 | 12/1991 |
| JP | 4-617 | 1/1992 |
| JP | 4-10015 | 1/1992 |
| JP | 4-10017 | 1/1992 |
| JP | 4-18617 | 1/1992 |
| JP | 4-000617 | 1/1992 |
| JP | 4-77809 | 3/1992 |
| JP | 4-44026 | 4/1992 |
| JP | 4-101207 | 4/1992 |
| JP | 4-101258 | 4/1992 |
| JP | 4-151704 | 5/1992 |
| JP | 4-155417 | 5/1992 |
| JP | 4-155419 | 5/1992 |
| JP | 4-167012 | 6/1992 |
| JP | 4-195507 | 7/1992 |
| JP | 4-205328 | 7/1992 |
| JP | 4-211815 | 8/1992 |
| JP | 4-233174 | 8/1992 |
| JP | 4-505816 | 10/1992 |
| JP | 5-66857 | 3/1993 |
| JP | 5-66858 | 3/1993 |
| JP | 5-66864 | 3/1993 |
| JP | 5-66867 | 3/1993 |
| JP | 5-33228 | 4/1993 |
| JP | 5-71944 | 9/1993 |
| JP | 5-225406 | 9/1993 |
| JP | 5-265591 | 10/1993 |
| JP | 6-4692 | 1/1994 |
| JP | 6-43965 | 2/1994 |
| JP | 6-131276 | 5/1994 |
| JP | 6-138985 | 5/1994 |
| JP | 6-149413 | 5/1994 |
| JP | 6-266479 | 9/1994 |
| JP | 7-056661 | 3/1995 |
| JP | 7-094232 | 4/1995 |
| JP | 7-248854 | 9/1995 |
| JP | 8-6668 | 1/1996 |
| JP | 8-7651 | 1/1996 |
| JP | 8-022437 | 1/1996 |
| JP | 8-501165 | 2/1996 |
| JP | 8-76879 | 3/1996 |
| JP | 8-76887 | 3/1996 |
| JP | 8-76898 | 3/1996 |
| JP | 8-076889 | 3/1996 |
| JP | 8-106340 | 4/1996 |
| JP | 8-249242 | 9/1996 |
| JP | 9-62416 | 3/1997 |
| JP | 9-130359 | 5/1997 |
| JP | 9-212260 | 8/1997 |
| JP | 9-275675 | 10/1997 |
| JP | 9-306451 | 11/1997 |
| JP | 10-846369 | 3/1998 |
| JP | 10-91292 | 4/1998 |
| JP | 10-91293 | 4/1998 |
| JP | 10-124194 | 5/1998 |

| | | |
|---|---|---|
| JP | 11-231969 | 8/1999 |
| WO | 90/10925 | 9/1990 |

OTHER PUBLICATIONS

*Mobile PC*, Mar. 1996, pp. 102–103 (Japanese magazine with English language translation).

*Mobile PC*, Jul. 1996, pp. 86–87 (Japenese magazine with English language translation).

*ASCII,*, A Monthly Magazine of Home & Office Computer Science , vol. 5, No. 227, May 1996 (Japenese magazine with English language translation).

*ASCII*, A Monthly Magazine of Home & Office Computer Science, vol. 6, No. 228, Jun. 1996, pp. 330–331 (Japanese magazine with English language translation).

*ASCII DOS/V Issue*, A Monthly Magazine of DOS/V Computer , vol. 8, No. 13, Aug. 1996, p. 210 (Japanese magazine with English language translation).

*ASCII Dos/V Issue*, A Monthly Magazine of DOS/V Computer, vol. 2, No. 9, Sep. 1996, p. 139 (Japanese magazine with English language translation).

Research Disclosure No. 333 "Integral Distributed Battery Pack for Portable Systems", Jan. 1996. (English Abstract).

Anthony, Robert S. "Color Pentium Notebooks: On the Road with the Pentium", *PC Magazine*, Jan. 23, 1996, pp. 101–103.

PORTABLE-TYPE INFORMATION APPARATUS

The subject application is a continuation of application Ser. No. 09/879,115 filed Jun. 13, 2001, now U.S. Pat. No. 6,724,615; which, in turn, is a continuation of application Ser. No. 08/885,857 filed Jun. 30, 1997, now U.S. Pat. No. 6,411,503 issued Jun. 25, 2002.

BACKGROUND OF THE INVENTION

1. Field of the Invention

The present invention relates to a portable-type information apparatus such as a notebook-type personal computer or a word processor, particularly to a portable-type information apparatus which is largely improved in extendability and portability.

2. Description of the Related Art

Recently, miniaturization of portable-type information apparatuses such as notebook-type personal computers has been significantly accelerated due to the rapid progress of electronic technology, whereby the user can always carry the information apparatus with him even outside the office.

Information apparatuses, particularly notebook type personal computers, have often been provided with various connectors for the connection of external keyboards, mice, external CRTs, printers or others, for extending the functions thereof.

Since recently marketed notebook-type personal computers have already been miniaturized in size and weight to a large extent, it is difficult to further improve the portability without sacrificing the extendability.

Accordingly, an object of the present invention is to provide a reasonable and economical information apparatus of a portable type improved in operability and portability without deteriorating the extendability, based on a novel technical idea.

SUMMARY OF THE INVENTION

According to one aspect of the present invention, a portable-type information apparatus having an information apparatus body comprises a detachable connector unit provided with a plurality of connectors adapted to be detachably connected to peripheral units and with at least one connector adapted to be detachably connected to the information apparatus body; connection means provided on the information apparatus body, for the connection between the connector unit and the information apparatus body; and a detachable battery unit containing at least one battery and having substantially the same size as that of the connector unit; and wherein the battery unit and the connector unit can alternatively be connected to the information apparatus in substantially the same connecting position relative to the information apparatus body.

Preferably the battery unit is connected to the information apparatus body through the connection means. Also, preferably, coupling means are provided to transmit electrical power from the battery unit to the information apparatus body. Preferably, at least one fastener unit is mounted between the information apparatus body and the connector unit affording mechanical detachable fixation therebetween. Also, preferably, the connector unit is mechanically detachably fixed to the information apparatus body through said at least one fastener unit. Preferably, the connector unit and the battery unit are alternatively detachably fixed to the back side of the information apparatus body.

According to another aspect of the present invention, a portable-type information apparatus having an information apparatus body comprises a detachable connector unit provided with a plurality of connectors adapted to be detachably connected to peripheral units and with at least one connector adapted to be detachably connected to the information apparatus body connection means provided on the information apparatus body, for the connection between the connector unit and the information apparatus body; and a detachable battery unit containing at least one battery and having substantially the same size as that of the connector unit, said battery unit being connectable to the information apparatus body through the connection means.

Preferably, coupling means is provided to transmit electrical power from the battery unit to the information apparatus body. Also, preferably, at least one fastener unit is mounted between the information apparatus body and the connector unit for a mechanical detachable fixation therebetween. Preferably, the connector unit is mechanically detachably fixed to the information apparatus body through said at least one faster. Also, preferably, the connector unit and the battery unit are alternatively detachably fixed to the back side of the information apparatus body.

According to further aspect of the invention, a connector unit adapted to be detachably connected to a portable-type information apparatus having an information apparatus body comprises a plurality of connectors adapted to be detachably connected to peripheral units; at least one connector adapted to be detachably connected to the information apparatus body; and at least one battery enclosed therein to supply electrical power to the information apparatus body.

Preferably, connection means are provided for the connection between the connector unit and the information apparatus body and wherein coupling means is provided to supply electrical power from said at least one battery to the information apparatus. Also, preferably, at least one fastener unit is provided between the information apparatus body and the connector unit for a mechanical detachable fixation therebetween. Preferably, it is detachably fixed to the back side of the information apparatus body.

BRIEF DESCRIPTION OF THE DRAWINGS

These and other objects of the present invention will become apparent from the following detailed description of the preferred embodiment of the invention, taken in connection with the accompanying drawings.

In the drawings.

DESCRIPTION OF THE PREFERRED EMBODIMENTS

The present invention will be described in more detail below with reference to the preferred embodiments illustrated in the attached drawings.

Figure 1:
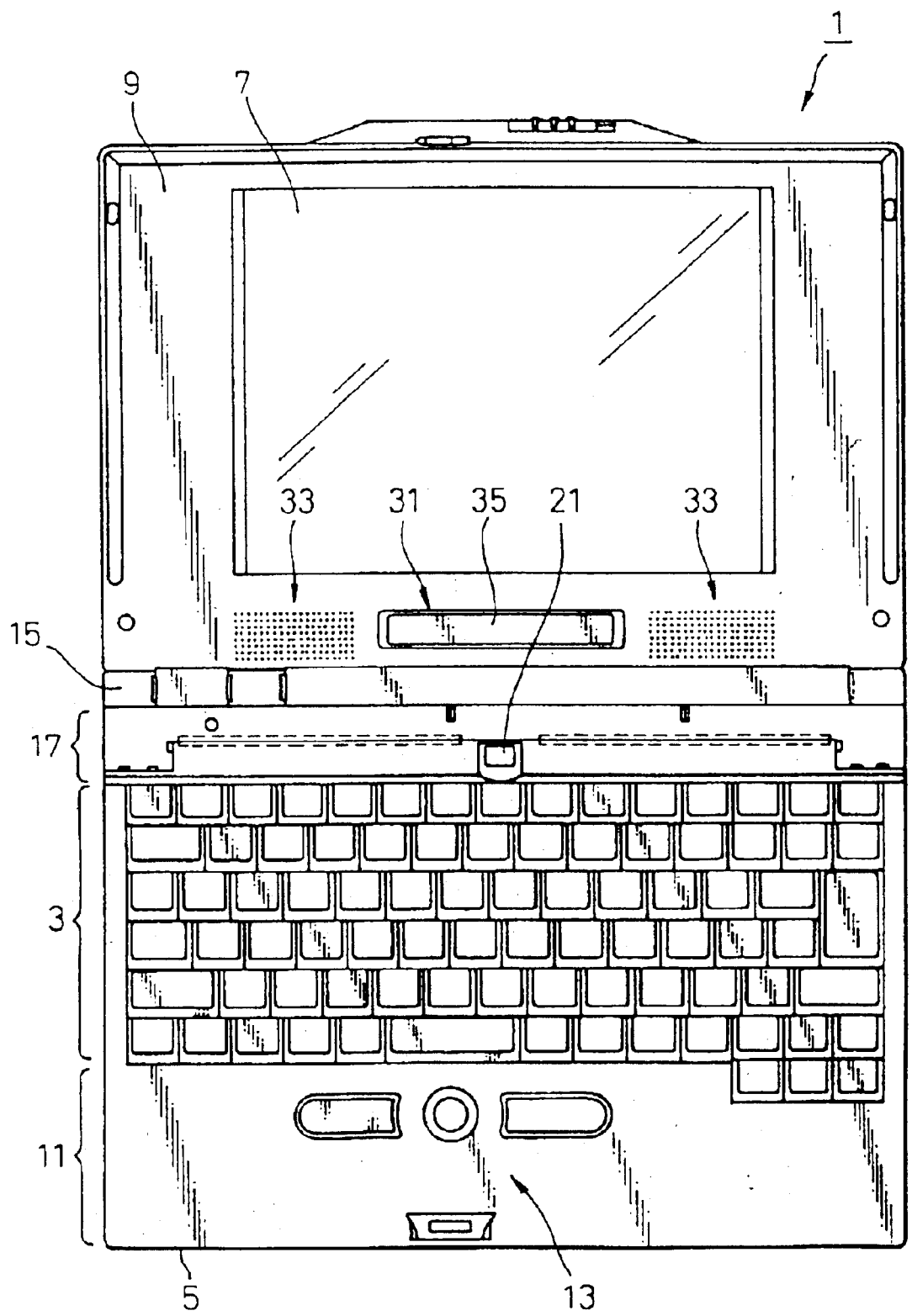
FIG. 1 is a plan view of a notebook type personal computer according to one embodiment of the present invention, in an open state.

FIG. 1 is a schematic plan view of a notebook-type personal computer 1 according to one embodiment of the present invention. With reference to this drawing, the personal computer 1 consists of a lower housing 5 which is built in a main circuit board carrying a CPU or other components, and having a keyboard 3 on the upper surface thereof, and an upper housing 9 coupled, in a hinged manner, to an edge portion (innermost side) of the lower housing 5 and having a liquid crystal display 7 in a central area thereof. The upper housing 9 is folded onto the lower housing 5 to form an integral case convenient for transportation.

On the operator's side relative to the keyboard 3 extending in the central area of the upper surface of the lower housing 5, there is provided a palm rest section 11 wherein a pointing device 13 of a ball type is provided at a center thereof.

A hinge section 15 is provided along the innermost edge of the lower housing 5, farthest from the operator's side beyond the keyboard 3, for coupling to the upper housing 9 while leaving an upper surface vacant space 17 of about 20 mm wide between the hinge section 15 and the keyboard 3.

In a central region of the upper surface vacant area 17, a suspend/resume key 21 is provided. The suspend/resume key 21 has a function of interrupting the supply of electric power to electronic parts, including CPU and those relating to the output/input, except for memories, so that the power consumption in the personal computer is restricted (i.e., limited) to a lower level than a normal operating power consumption level.

The liquid crystal display 7, of a rectangular shape and large size is provided in a central area of the display surface of the upper housing 9. Generally in a lower area of the upper housing beneath the liquid crystal display 7, a so-called state-displaying section 31 is provided in a central region which confronts the suspend/resume key 21 of the lower housing 5 when the upper housing 9 is closed (folded) to the lower housing 5. A sound output section 33 having a number of small apertures is provided on both sides of the state-displaying section 31.

The state-displaying section 31 has a function of visually displaying whether or not a predetermined electronic device, internal or external to the personal computer is operative or inoperative, and basically consists of an elongated liquid crystal substrate 35.

The rear surface of the lower housing 5, has none of the various connectors for connection to external keyboards, mice, external CRTs or printers which usually are provided in the conventional notebook type personal computer, and, instead, a specially designed common connector 51 which is a combination of the above-mentioned connectors as a single unit is provided. Therefore, a space in the lower housing which would be occupied by these connectors in the conventional computer is unnecessary, and thus, miniaturization of the personal computer is possible. Further, two or more common connectors (not shown) may be provided.

Figure 2A:
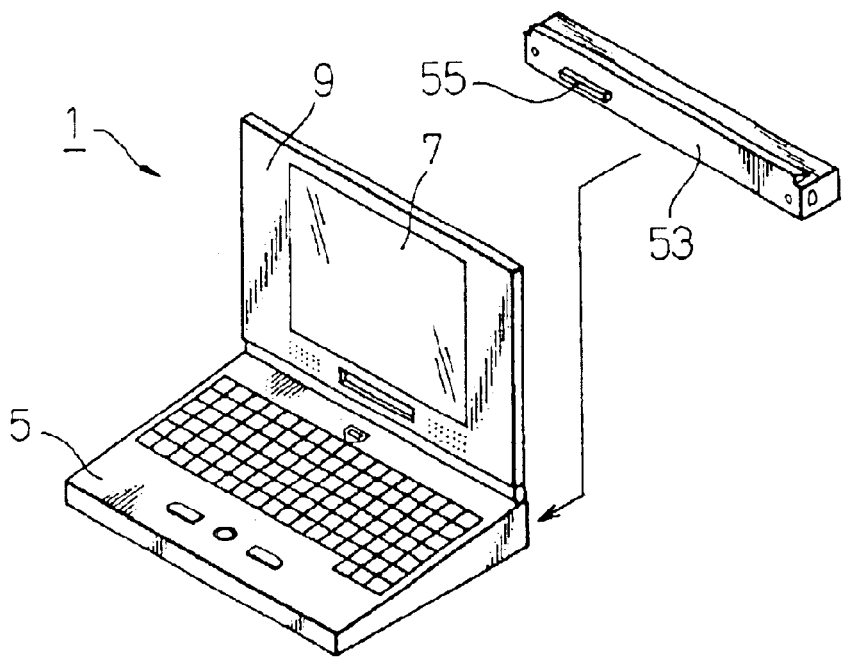
FIG. 2A is a perspective view as seen from a front side.
Figure 2B:
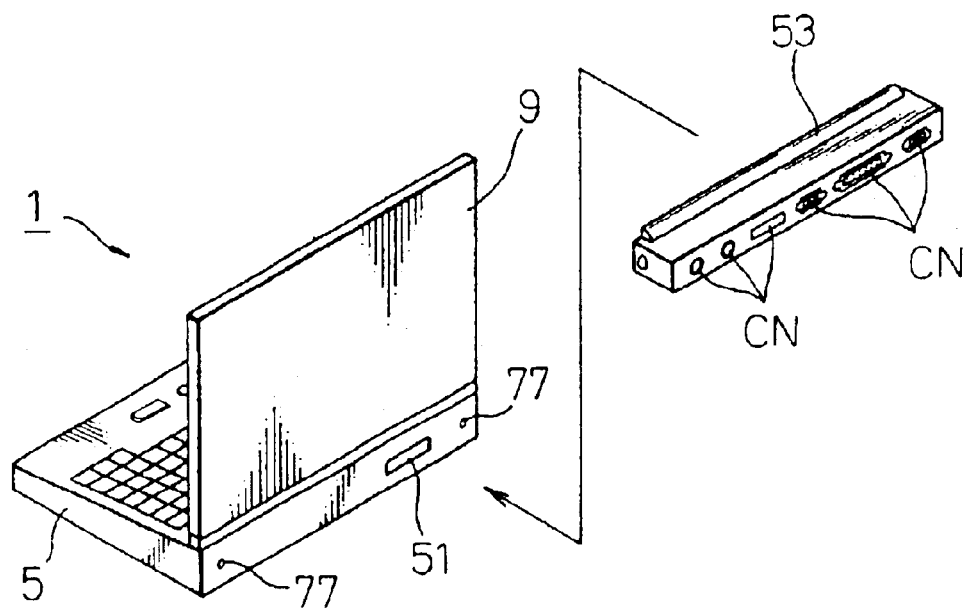
FIG. 2B is a perspective view as seen from a rear side, of the comparator of FIG. 1, illustrating the relationship of a connector box relative to the personal computer.

As shown in FIGS. 2A and 2B, the common connector 51 on the rear surface of the lower housing 5 (of the personal computer 1) is adapted to be detachably connected to a connector section 55 provided on a rectangular front surface of a connector box 53 (which is also called a port replicator) so that the connector box 53 is detachably mounted to the rear surface of the lower housing 5.

Figure 3A:
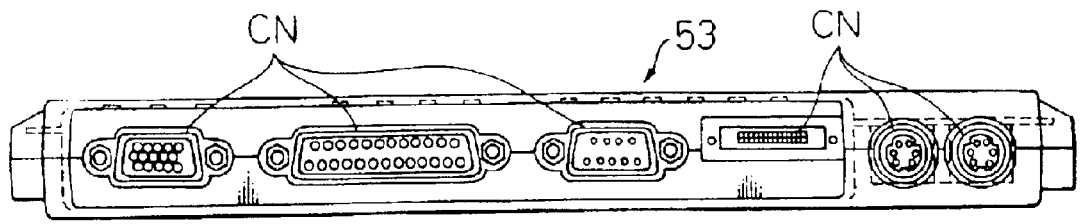
FIG. 3A is a rear view.

As shown in FIG. 3A, the connector box 53 is provided with various connectors CN on the rear surface thereof, which would be carried on the conventional personal computer.

The connector section 55 on the front surface of the connector box 53 consists of a terminal having 60 pins and a pair of guide pins 57 on both sides thereof for facilitating the connector engagement. The guide pins 57 are engageable with corresponding guide holes (not shown) provided at corresponding positions in the lower housing and also function as grounding connectors.

On both sides of a front wall of the connector box 53 are provided a pair of fasteners 61 for reliably fixing the connector box 53 to the rear surface of the lower housing 5.

Figure 4:
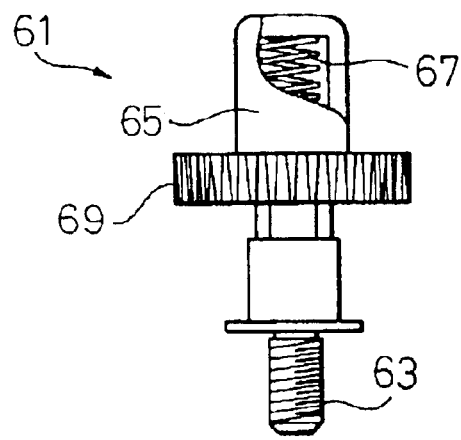
FIG. 4 is an enlarged side sectional view of a main part of a fastener.

As shown in FIG. 4, the fastener 61 basically consists of a threaded rod 63 so as having a thread at a tip 30 end, a main body 65 accommodating the threaded rod 63 so as to be movable in the axial direction and coupled to the threaded rod 63 to be rotatable therewith, and a compression coil spring 67 mounted within the main body 65 for biasing the threaded rod 63 outwardly. An enlarged disk 69 having a knurled periphery is provided in the main body 65.

Figure 3B:
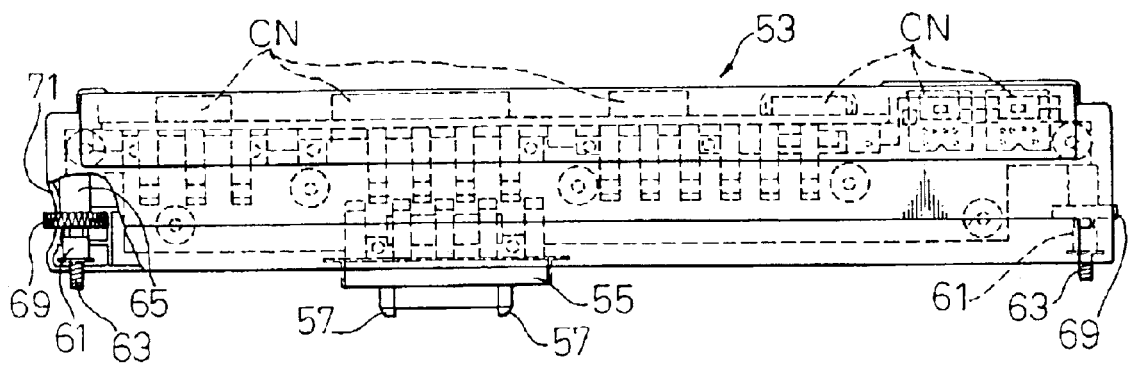
FIG. 3B is a top view.
Figure 3C:
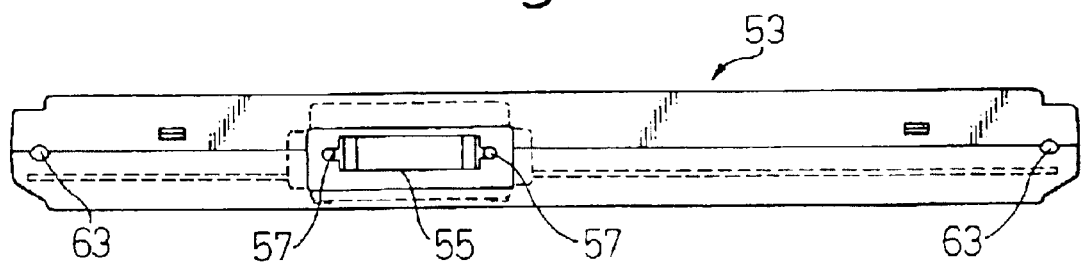
FIG. 3C is a front view and FIG. 3D is a leftside view, of the connector box.
Figure 3D:
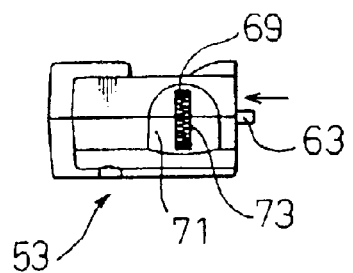

When the fasteners 61 are attached to a predetermined position on the opposite sides of the connector box 53, the thread of the threaded rod 63 partially projects outwardly from the front surface of the connector box 53, and the enlarged disk 69 partially projects outwardly from a rectangular window 73 formed in a recess 71 of the respective end wall of the connector box 53 (see FIGS. 3B, 3D). Since this projected amount is actually very small, the knurled periphery looks as if it is substantially flush with the end surface of connector box 53.

During the attachment of the connector box 53 to the personal computer 1 (i.e., to the lower housing 5), the connector section 55, provided on the front surface of the connector box 53, is engaged with the common connector 51 on the rear surface of the personal computer 1 so that the rear surface of the personal computer 1 and the front surface of the connector box 53 are wholly or substantially brought into surface-contact with each other. At this time, the threaded rods 63 projected from the respective sides of the front surface of the connector box 53 just confront female thread sections (fastening sections) 77 (see FIG. 2B) provided at corresponding positions on the rear surface of the personal computer 1. More specifically, the thread section of the threaded rod 63 is pushed into the main body 65 against a biasing force of the compression coil spring 67 in the main body 65 of the fastener 61, while being fittingly in contact with the female thread section 77 (that is, while maintaining a state to be easily engageable with the female thread 30 section 77).

Then, the operator manually rotates the enlarged disk 69, using the knurled periphery thereof, through the window 73 of the recess 71 provided on the respective end surface of the connector box 53, in a required direction (selected in accordance with the thread direction), whereby the threaded rod 63 rotates therewith to completely screw the threaded rod 63 (thread section) into the female thread section 77.

As described above, since the fastener structure is adapted so that the movable threaded rod 63 is biased outwardly and rotated by the operation of the enlarged disk 69, the fastening operation of the fastener 61 is carried out very easily in a mechanical manner. Similarly, the removal of the connector box 53 is also facilitated.

According to this embodiment of the above structure, since various connectors usually provided in the conventional personal computer are removed, it is possible to miniaturize an outer size of the personal computer, whereby the portability thereof is greatly enhanced. Instead of the removed connectors, a connector box 53 is prepared, which is capable of being electrically coupled in a very simple manner to the personal computer by a single engagement connection (between the common connector and the connector section 55). Also, according to the characteristic structure of the fastener 61 provided on the respective side of the connector box 53, mounting/dismounting of the connector box 63 can be safely and reliably carried out. Thus, there is no inconvenience in the utility and operability of electric wiring or arrangement.

Figure 5:
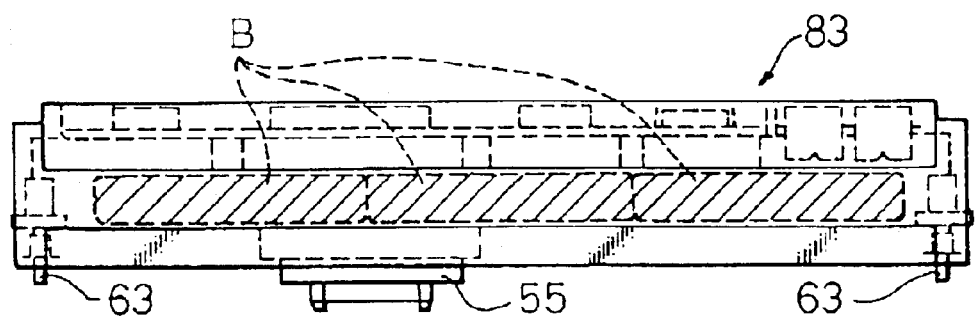
FIG. 5 is a plan view of a connector box accommodating batteries therein.

Another type connector box 83 may be provided as shown in FIG. 5, wherein cylindrical rechargeable batteries B for the extension are longitudinally accommodated in a central space of the interior of the connector box. On the other hand, power supply lines are provided both in the common connector of the information apparatus body and the connector section 55 of the connector box 83. The arrangement of the various connectors CN, common connector, fastener or others are basically the same as those in the above connector box 53, and therefore the explanation thereof will be eliminated herein.

According to the above connector box 83 with batteries, the operative time of the personal computer can be prolonged (for example, by about 1.5 hours if three batteries B are accommodated) to facilitate both the portability and the extendability.

Figure 6:
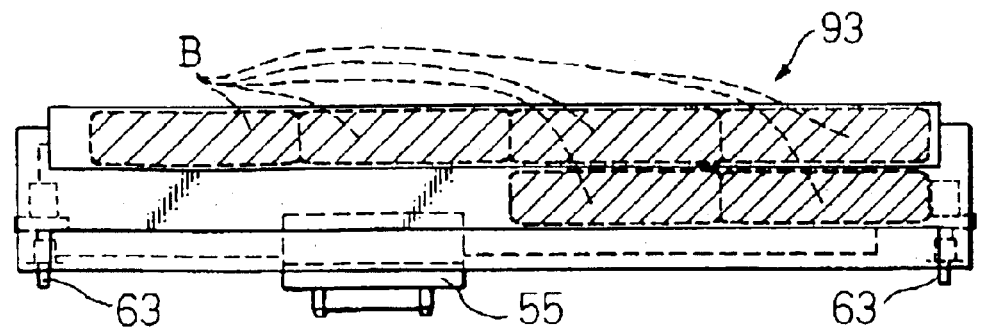
FIG. 6 is a plan view of a battery pack.

In addition, as shown in FIG. 6, a so-called 5 (extension) battery pack 93 may be provided alternative to the connector boxes 53 and 83 described above, which has generally the same profile and size as those of the connector box 53, but has none of the various connectors CN as are provided on the rear surface of the connector box 53 in FIG. 5. Instead of the various connectors, batteries B are accommodated in the interior thereof.

When the battery pack 93 is used, although the function-expendability inherent to a connector box is lost, the operative time of the personal computer is greatly prolonged (for example, by about 3 hours if six batteries are accommodated), which facilitates the portability of the personal computer 1.

Since the battery pack has substantially the same profile and size as the connector boxes 53, 83, it is favorable in appearance and convenient in storage.

The connector box 53, the connector box 83 with batteries and the battery pack 93 can be alternatively mounted to the personal computer 1, which provides various systems constructed by the personal computer and peripheral devices thereof, and widens the user's choice.

While the above-mentioned embodiments are limited to the application of the present invention to a personal computer, the present invention should not be limited thereto but may be effectively applicable also to other portable-type electronic apparatuses such as a word processor.

As described above, according to the present invention, it is possible to provide a very reasonable and economical portable type information which is improved in operability and portability without deteriorating the extendability More specifically, according to the portable type information apparatus since a plurality of connectors of various kinds for the extension are removed, the apparatus can be miniaturized in size and reduced in weight. In spite of the removal of such connectors, the extendability is not deteriorated because of the provision of a common connector for coupling a connector box to the personal computer. If a fastening section is provided, the rigid fixation of the connector box becomes possible to enhance the stability and the mechanical strength. If a connector section of a connector box with batteries is coupled to the common connector, the operative time can be prolonged without deteriorating the extendability. If a battery pack is used, the operative time can be further prolonged. If the portable information apparatus is a notebook-type personal computer, the improvement in extendability and operative time enhances the utility of the personal computer.

Also, the connector box according to the present invention is easily handled and can be mounted to the portable type information apparatus in a simple manner, resulting in an improvement in extendability of the portable-type information apparatus and a reduction in the weight thereof. If a fastener is provided, the connector box can be rigidly fixed to result in favorable stability and mechanical strength. If a battery is provided, it is possible to prolong the operating time without deteriorating the extendability.

Further, according to a battery pack of the present invention, a further prolongation of operating time of the portable type information apparatus is available. Since the battery pack is mounted to the portable type information apparatus alternatively to the connector box, various options can be adopted in accordance with the desired uses.

It is to be understood that the invention is by no means limited to the specific embodiments illustrated and described herein, and that various modifications thereof may be made which come within the scope of the present invention as defined in the appended claims.

What is claimed is:

1. A connector unit detachably connectable to an information apparatus having a first connector, said connector unit comprising:
    a housing;
    a plurality of connectors on said housing for extension of said information apparatus;
    a second connector on said housing corresponding to, and connectable to, the first connector on said information apparatus;
    two fixing members affixing said connector unit to said information apparatus, said two fixing members being arranged on said connector unit such that said second connector is positioned in a region between said two fixing members; and
    a holding part in said housing to hold a battery.

2. The connector unit of claim 1, wherein said battery is rechargeable.

3. The connector unit of claim 1, wherein said battery supplies electric power to said information apparatus.

4. The connector unit of claim 3, wherein the electric power is supplied from said battery to said information apparatus through said second connector.

5. The connector unit of claim 1, wherein said second connector is arranged on one side, and said plurality of connectors are arranged on an opposite side, of said housing.

6. The connector unit of claim 1, wherein said second connector is a single common connector.

7. The connector unit of claim 1, wherein said fixing members of said connector unit comprise fasteners.

8. An information apparatus, comprising:
    a body having a main circuit board arranged therein and having a first connector thereon; and
    a connector unit detachably connectable to said body and comprising:
        a plurality of connectors for extension of said information apparatus,
        a second connector corresponding to, and connectable to, the first connector on the body, two fixing members affixing said connector unit to said information apparatus, said two fixing members being arranged on said connector unit such that said second connector is positioned in a region between said two fixing members, and a holding part to hold a battery.

9. The information apparatus of claim 8, wherein said battery is rechargeable.

10. The information apparatus of claim 8, wherein said battery supplies electric power to said body.

11. The information apparatus of claim 10, wherein the electric power is supplied from said battery to said body through said second connector.

12. The information apparatus of claim 8, wherein said second connector is arranged on one side of said connector unit, and said plurality of connectors are arranged on an opposite side of said connector unit.

13. The information apparatus of claim 8, wherein said second connector is a single common connector.

14. The information apparatus of claim 8, wherein said fixing members of said connector unit comprise fasteners.

15. The information apparatus of claim 8, wherein said body comprises a notebook type personal computer.

16. An information apparatus detachably connectable to plural peripheral devices, comprising:

a body having a main circuit board therein and a first common connector having plural sets of connection terminals therein, each set being designated for connection to a respective said peripheral unit; and a connector unit detachably connectable to said body and comprising:
a holding part to hold a battery,
a plurality of connectors on a first portion of said connector unit, each of the plurality of connectors having a set of terminals therein designated for connection to a respective peripheral unit, a second common connector on a second portion of said connector unit, the second common connector having plural sets of connection terminals therein respectively corresponding to the plural sets of connection terminals of the first common connector and detachably connectable thereto, each set of terminals of the second common connector being electrically connected to the respective set of connection terminals of a corresponding connector on the first portion of the connector unit, and two fixing members detachably affixing the connector unit to the information apparatus body, the two fixing members being arranged on the connector unit such that the second common connector is positioned in a region of the second portion of the connector unit between the two fixing members.

17. An information apparatus as recited in claim 16, wherein:

the first and second portions of the connector unit comprise spaced forward and rearward sidewalls; and the two fixing members extend from the connector unit beyond the forward sidewall thereof for engaging corresponding engaging elements in the rear wall of the body of the information apparatus.

18. An information apparatus as recited in claim 16, wherein the second common connector is positioned between the two fixing members.

19. An information apparatus as recited in claim 18, wherein the plurality of connectors on the first portion of the connector unit are positioned between the two fixing members.

* * * * *

UNITED STATES PATENT AND TRADEMARK OFFICE
CERTIFICATE OF CORRECTION

PATENT NO. : 6,804,113 B2
DATED : October 12, 2004
INVENTOR(S) : Ko Kambayashi et al.

It is certified that error appears in the above-identified patent and that said Letters Patent is hereby corrected as shown below:

Title page,
Item [56], References Cited, OTHER PUBLICATIONS, please change "*MOBILE PC*, Jul. 1996, pp. 86-87 (Japenese magazine with English language translation)" to -- *MOBILE PC*, Jul. 1996, pp. 86-87 (Japanese magazine with English language translation) --; and please change "*ASCII,*, A Monthly Magazine of Home & Office Computer Science, Vol. 5, No. 227, May 1996 (Japenese magazine with English language translation)" to -- *ASCII*, A Monthly Magazine of Home & Office Computer Science, Vol. 5, No. 227, May 1996 (Japanese magazine with English language translation) --

Signed and Sealed this

Twenty-fourth Day of May, 2005

JON W. DUDAS
*Director of the United States Patent and Trademark Office*